United States Patent
Hayashi et al.

(10) Patent No.: US 10,432,843 B2
(45) Date of Patent: Oct. 1, 2019

(54) IMAGING APPARATUS, CONTROL METHOD OF IMAGING APPARATUS, AND NON-TRANSITORY RECORDING MEDIUM FOR JUDGING AN INTERVAL BETWEEN JUDGEMENT TARGETS

(71) Applicant: OLYMPUS CORPORATION, Hachioji-shi, Tokyo (JP)

(72) Inventors: Toshikazu Hayashi, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 6 days.

(21) Appl. No.: 15/355,900

(22) Filed: Nov. 18, 2016

(65) Prior Publication Data
US 2017/0150035 A1    May 25, 2017

(30) Foreign Application Priority Data
Nov. 25, 2015    (JP) .................. 2015-229966

(51) Int. Cl.
  H04N 5/232    (2006.01)
  G06K 9/62    (2006.01)
  G06T 7/00    (2017.01)

(52) U.S. Cl.
  CPC ....... *H04N 5/23212* (2013.01); *G06K 9/6202* (2013.01); *G06T 7/0002* (2013.01); *H04N 5/23216* (2013.01); *H04N 5/23222* (2013.01); *H04N 5/23245* (2013.01); *H04N 5/23293* (2013.01)

(58) Field of Classification Search
  CPC ........... H04N 5/23212; H04N 5/23245; H04N 5/23222; H04N 5/23216; H04N 5/23293; G06T 7/0002; G06K 9/6202

USPC .............................. 348/94–95, 349
See application file for complete search history.

(56) References Cited

U.S. PATENT DOCUMENTS

| | | | |
|---|---|---|---|
| 8,212,869 B2 * | 7/2012 | Iwanaga | G06T 7/001 348/87 |
| 9,390,315 B1 * | 7/2016 | Yalniz | G06K 9/4609 |
| 9,607,406 B2 * | 3/2017 | Hata | G01B 11/02 |
| 9,741,134 B2 * | 8/2017 | Moran | G06K 9/4604 |
| 9,989,952 B2 * | 6/2018 | Ghazizadeh | C12N 15/1065 |
| 2010/0157135 A1 * | 6/2010 | Dossaji | G02B 7/36 348/348 |

(Continued)

FOREIGN PATENT DOCUMENTS

| | | | |
|---|---|---|---|
| JP | 10-281728 | * 10/1998 | G01B 11/00 |
| JP | 10-281728 A | 10/1998 | |

(Continued)

OTHER PUBLICATIONS

Office Action issued in corresponding Japanese Patent Application No. 2015-229966 dated Mar. 19, 2019, consisting of 9 pp. (English Translation Provided).

*Primary Examiner* — Lin Ye
*Assistant Examiner* — Chan T Nguyen
(74) *Attorney, Agent, or Firm* — Volpe and Koenig, P.C.

(57) ABSTRACT

According an embodiment, an imaging apparatus includes an image acquiring unit which acquires a judgment image showing arranged judgment targets, and an interval judging unit which judges whether the interval between the judgment targets is proper on the basis of figures of the judgment targets shown in the judgment image.

10 Claims, 8 Drawing Sheets

(56) References Cited

U.S. PATENT DOCUMENTS

| | | | | |
|---|---|---|---|---|
| 2013/0250095 A1* | 9/2013 | Inoue | ............... | G06T 7/0004 |
| | | | | 348/94 |
| 2014/0104414 A1* | 4/2014 | McCloskey | ......... | G06Q 10/083 |
| | | | | 348/135 |
| 2014/0300730 A1* | 10/2014 | Onishi | ............... | G01B 11/14 |
| | | | | 348/95 |
| 2015/0221128 A1* | 8/2015 | Bhatawadekar | ...... | G06F 16/283 |
| | | | | 345/419 |
| 2016/0104299 A1* | 4/2016 | George | ............... | G06K 9/6202 |
| | | | | 382/199 |
| 2016/0350921 A1* | 12/2016 | Bataller | ............... | G06T 7/80 |

FOREIGN PATENT DOCUMENTS

| | | |
|---|---|---|
| JP | 2013134183 A | 7/2013 |
| JP | 2015001146 A | 1/2015 |

\* cited by examiner

IMAGING APPARATUS, CONTROL METHOD OF IMAGING APPARATUS, AND NON-TRANSITORY RECORDING MEDIUM FOR JUDGING AN INTERVAL BETWEEN JUDGEMENT TARGETS

CROSS-REFERENCE TO RELATED APPLICATIONS

This application is based upon and claims the benefit of priority from the prior Japanese Patent Application No. 2015-229966, filed Nov. 25, 2015, the entire contents of which are incorporated herein by reference.

FIELD

The present invention relates to an imaging apparatus, a control method of the imaging apparatus, and a non-transitory recording medium.

BACKGROUND

A method of measuring, for example, the length and position of an object by use of a photographic image is in practical use. For example, Patent Literature 1 describes the calculation of actual dimensions of an object based on an image showing a measurement reference whose dimensions are known together with a target which is a target of measurement.

When the target is measured by, for example, the method described in Jpn. Pat. Appln. KOKAI Publication No. 10-281728, the measurement reference needs to be included in the image together with the measurement target, which is a troublesome task.

There is another method of measuring the dimensions of the target on the basis of the distance between an imaging apparatus and the target, the dimensions of the target on the image, and the focus distance of an imaging lens. However, according to such a method, the interval between targets different in distance is calculated, so that an image and a distance need to be acquired for every target, which is again a troublesome task.

The present invention is intended to provide an imaging apparatus, a control method of the imaging apparatus, and a non-transitory recording medium whereby the interval between targets can be readily measured.

SUMMARY

According an embodiment, an imaging apparatus includes an image acquiring unit which acquires a judgment image showing arranged judgment targets, and an interval judging unit which judges whether the interval between the judgment targets is proper on the basis of figures of the judgment targets shown in the judgment image.

According to the invention, it is possible to provide an imaging apparatus, a control method of the imaging apparatus, and a non-transitory recording medium whereby the interval between targets can be readily measured.

BRIEF DESCRIPTION OF THE DRAWINGS

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

An imaging apparatus, a control method of the imaging apparatus, and a non-transitory recording medium according to one embodiment will hereinafter be described in detail with reference to the drawings.

Figure 1:
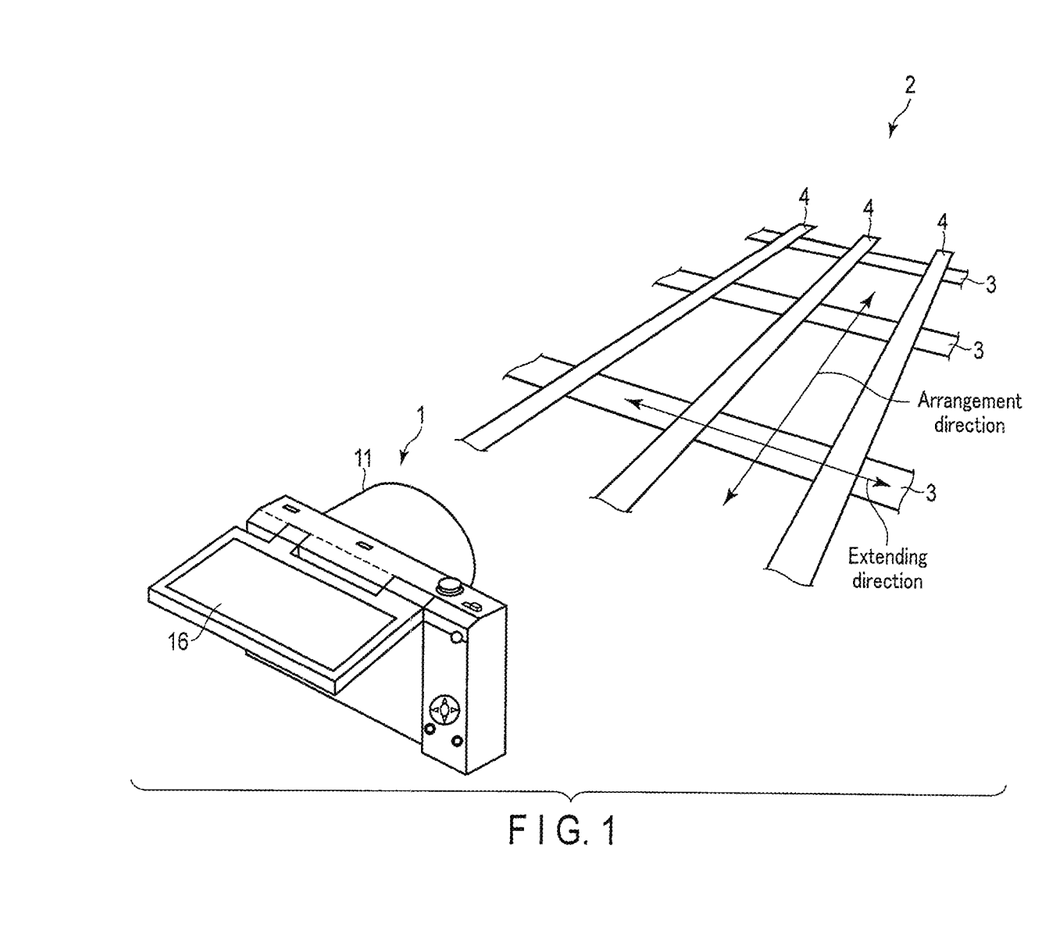
FIG. 1 is a diagram illustrating an example of the use of an imaging apparatus according to one embodiment.

FIG. 1 is an explanatory diagram showing an example of how a structure 2 composed of reinforcing bars that are arranged flush is imaged by an imaging apparatus 1. The imaging apparatus 1 is an apparatus which is used in, for example, a construction site and which acquires an image of the structure 2 and judges by the acquired image whether the interval between the reinforcing bars constituting the structure 2 is a preset interval (e.g. an equal interval).

The structure 2 comprises reinforcing bars 3 and reinforcing bars 4 that are arranged flush. The structure 2 is composed of the reinforcing bars 3 and the reinforcing bars 4 which are used in, for example, a floor slab and which are arranged in lattice form. Each of the reinforcing bars 3 and 4 is formed into the shape of a bar having a predetermined diameter. The reinforcing bars 3 are arranged flush parallel to one another at predetermined intervals. The direction in which the reinforcing bars 3 are arranged is referred to as an arrangement direction, the direction in which the reinforcing bars 3 extend is referred to as an extending direction, and a plane including the arrangement direction and the extending direction is referred to as an arrangement plane. The reinforcing bars 4 extend in a direction that intersects at right angles with the extending direction of the reinforcing bars 3, and are arranged flush parallel to one another at predetermined intervals. The arrangement direction is taken in the depth direction of a screen in the example shown in FIG. 1.

In this case, the "arrangement direction" can be represented as the "depth direction" or can be represented as a "photography optical axis direction", which has, however, a slight angle, in a broad sense, and can also be represented as a "distance direction from the imaging apparatus" and a "distance change direction". In the example of FIG. 1, the "extending direction" can also be represented as intersecting substantially at right angles with the arrangement direction, and can therefore be represented in a manner corresponding to the above; for example, a "direction that intersects at right angles with the depth direction". Naturally, the "extending direction" can also be represented as a "screen right-left direction", a "field angle direction", an expansion direction of an image pickup device surface even when seen from FIG. 4, a direction of one side of an image pickup device, and an X-Y direction. In this case, the arrangement direction may be paraphrased as a "Z-direction".

The imaging apparatus 1 acquires a judgment image so that the reinforcing bars (the reinforcing bars 3 in the example of FIG. 1) arranged in the depth direction when seen from the imaging apparatus 1 will be targets of judgment. The imaging apparatus 1 judges by the acquired judgment image whether the targets are arranged at predetermined intervals. The imaging apparatus 1 may be configured to further judge whether the other reinforcing bars (the reinforcing bars 4 in the example of FIG. 1) arranged in a direction parallel to an imaging surface are arranged at predetermined intervals.

Figure 2:
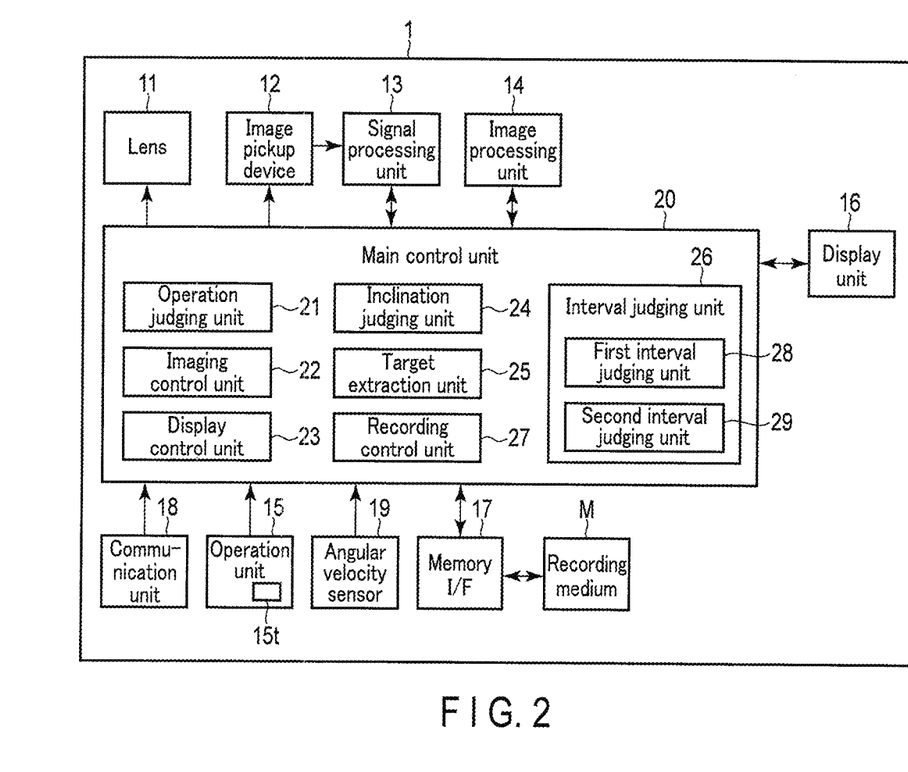
FIG. 2 is a diagram illustrating an example of a control system of the imaging apparatus according to one embodiment.

FIG. 2 is a block diagram showing an example of the configuration of the imaging apparatus 1.

As shown in FIG. 2, the imaging apparatus 1 comprises a lens 11, an image pickup device 12, a signal processing unit 13, an image processing unit 14, an operation unit 15, a display unit 16, a memory I/F 17, a communication unit 18, an angular velocity sensor 19, and a main control unit 20.

The lens 11 forms transmitted light into an image on the image pickup device 12. The lens 11 comprises an imaging lens, a diaphragm mechanism, and a lens control unit which controls the operations of the imaging lens and the diaphragm mechanism.

The imaging lens forms light rays from a subject into an image on an imaging surface of the image pickup device 12. The imaging lens comprises a combination of lenses.

The diaphragm mechanism is configured to open and close, and adjusts the amount of the light rays entering the image pickup device via the imaging lens under the control of the lens control unit.

The lens control unit is configured to be able to communicate with the main control unit 20. The lens control unit controls each of the operations of the imaging lens and the diaphragm mechanism in accordance with the input from the main control unit 21 or the operation of an operation member provided in the lens 11.

The imaging lens comprises, for example, a lens for focusing (focus lens), a lens (variable magnification lens) for changing the focus distance, and a relay lens. The lens control unit can change the focus distance by moving the variable magnification lens along the optical axis of the imaging lens. The lens control unit can detect the focus distance of the imaging lens by detecting the position of the variable magnification lens. The lens control unit can change the distance (subject distance) from the principal point of the imaging lens to the subject which is the focus target and the distance (figure distance) from the principal point to the imaging surface of the image pickup device 12 by moving the focus lens along the optical axis of the imaging lens. The lens control unit can detect the subject distance and the figure distance by detecting the position (focus position) of the focus lens at the time of focusing. The lens 11 inputs the detection results of the focus distance, the subject distance, and the figure distance to the main control unit 20.

Instead of the lens 11, the imaging apparatus 1 may be configured to comprise a mount to which the lens 11 can be attached.

The image pickup device 12 is provided in the rear of the lens 11, that is, inside the housing of the imaging apparatus 1. The image pickup device 12 comprises the imaging surface in which imaging pixels for photoelectrically converting light and storing a charge are arranged. A color filter is provided on a surface which light of each imaging pixel enters. The image pickup device 12 comprises, for example, a charge coupled devices (CCD) image sensor, a complementary metal oxide semiconductor (CMOS) image sensor, or some other image pickup device. The image pickup device 12 generates an image signal by converting, into an electric signal corresponding to the light amount, the subject figure which has been collected via the lens 11 and formed into the image on the imaging surface.

The signal processing unit 13 reads the image signal generated by the image pickup device 12 under the control of the main control unit 20. The signal processing unit 13 subjects the read image signal to various signal processing under the control of the main control unit 20. The signal processing unit 13 converts the signal-processed image signal into image data of a digital signal, and inputs the image signal to the main control unit 20.

As described above, the lens 11, the image pickup device 12, and the signal processing unit 13 constitute an imaging unit (image acquiring unit). The imaging unit acquires image data when the image pickup device 12 images the light which has been formed into an image on the imaging surface by the lens 11. The imaging unit acquires image data as a still image by the imaging action described above. The imaging unit sequentially acquires image data to be displayed as through-images. For example, the imaging unit can acquire successive image data displayable as a through-image when the signal processing unit 13 reads the image signals sequentially taken by the image pickup device 12 at a period based on the control of the main control unit 20.

The image processing unit 14 subjects the image data to various image processing such as a color correction, a gamma (γ) correction, a contrast correction, black-and-white/color mode processing, and through-image processing under the control of the main control unit 20. The image processing unit 14 compresses the image data by the JPEG method to convert the image data into JPEG data which is image data based on a JPEG method under the control of the main control unit 20. The image processing unit 14 inputs the JPEG data to the main control unit 20.

The operation unit 15 comprises multiple operation members for a user to perform various operations of the imaging apparatus 1. The operation members include, for example, a touch sensor 15*t* and various buttons. The touch sensor 15*t* is, for example, a resistive-film touch sensor or an electric-capacitance touch sensor. That is, the touch sensor 15*t* is a specified position acquiring unit which acquires information indicating a specified position in a certain region. The touch sensor 15*t* is provided integrally with a later-described display panel of the display unit 16, detects a signal (touch position signal) indicating a position on the display panel that is touched, and inputs the detected touch position signal to the main control unit 20.

The display unit 16 displays a screen on the basis of the image data input from the main control unit 20. The display unit 16 comprises a display device, and a drive circuit which displays the screen on the display device on the basis of the image data. The display unit 16 comprises, for example, the display panel as the display device. The display panel is, for example, a liquid crystal display, an organic EL display, or some other display device which displays screens. The display panel functions as a touch panel (touch screen) when the above-mentioned touch sensor 15*t* is integrated therewith. The display panel is provided, for example, on a support which is rotatably provided from the backside of the housing of the imaging apparatus 1. The support is provided rotatably around the axis of a hinge provided on the backside of the housing. Thus, the angle of the display panel can be changed. Although displaying a judgment result on this display unit is one important embodiment, a communication unit may be provided to remotely or externally display the judgment result, or the judgment result may be reflected in other control without the display of the detection results.

The memory I/F 17 comprises a card slot into which a recording medium M having contact terminals can be inserted, and a contact terminal which is electrically connected to the contact terminals of the recording medium M when the recording medium M is inserted in the card slot. The recording medium M is, for example, a memory card. The memory I/F 17 relays the input/output of data between the recording medium M and the main control unit 20.

The communication unit 18 is an interface to communicate with other devices. The communication unit 18 wirelessly communicates with an unshown access point and can thereby communicate with other devices on a network to which the access point is connected. The communication unit 18 may be configured to communicate with information processing apparatuses such as a smartphone and a notebook personal computer by an ad hoc mode. The communication unit 18 may be configured to perform a wired communication with the above-mentioned information processing apparatuses.

The angular velocity sensor 19 detects, as an angular velocity signal, a rotational movement resulting from the change in the pose of the housing of the imaging apparatus 1. The angular velocity sensor 19 is, for example, a gyrosensor. The angular velocity sensor 19 respectively detects a rotational movement in a pitch direction on the horizontal direction of the imaging surface of the image pickup device 12, a rotational movement in a yaw direction on the vertical direction of the imaging surface, and a rotational movement in a roll direction on the optical axis of the lens 11, and generates angular velocity signals.

The main control unit 20 controls the operation of each part of the imaging apparatus 1. The main control unit 20 comprises, for example, a CPU and a memory. The main control unit 20 enables various functions, for example, when the CPU reads and executes a program stored in the memory. For example, the main control unit 20 functions as an operation judging unit 21, an imaging control unit 22, a display control unit 23, an inclination judging unit 24, a target extraction unit 25, an interval judging unit 26, and a recording control unit 27.

The operation judging unit 21 judges the operation input by the operation unit 15. That is, the operation judging unit 21 recognizes the kind of operation indicated by the operation unit 15. The operation judging unit 21 also recognizes the touched position of the display panel on the basis of the touch position signal input from the touch sensor 15*t* of the operation unit 15.

The imaging control unit 22 controls each part to perform an operation to acquire an image. For example, the imaging control unit 22 inputs a control signal to the lens 11, and thereby drives the diaphragm mechanism to perform exposure control. The imaging control unit 22 also inputs a control signal to the lens 11, and thereby drives the focus lens to perform focus processing. Specifically, the imaging control unit 22 performs automatic focus (AF) processing to focus on a given subject in a search region (AF area) to obtain a focus state on the basis of the light rays through the imaging lens.

Furthermore, the imaging control unit 22 reads an image signal from the image pickup device 12 by the signal processing unit 13, and performs A/D conversion of the image signal to acquire image data. For example, the imaging control unit 22 acquires image data as a judgment image in a state where the reinforcing bars 3 which are the targets of judgment are in focus.

Moreover, for example, the imaging control unit 22 controls the signal processing unit 13 to read the image signal generated by the image pickup device 12 at a preset period, and thereby acquires image data displayable on the display unit 16 as a through-image.

The imaging control unit 22 may be configured to perform, for example, the automatic exposure (AE) processing, white balance (WB) adjustment processing, and various other processing.

The display control unit 23 controls display processing by the display unit 16. For example, the display control unit 23 displays a screen on the display device of the display unit 16 by inputting the image data to the display unit 16. For example, the display control unit 23 displays a still image on the display unit 16 by inputting the image data acquired by the imaging action to the display unit 16. The display control unit 23 also displays the through-image on the display unit 16 by inputting the image data successively acquired by the imaging unit to the display unit 16.

Furthermore, the display control unit 23 generates OSD data to display, on the display unit 16, an on-screen display (OSD) including various indications such as icons and characters on the basis of, for example, various setting information and the state of the imaging apparatus 1. For example, the display control unit 23 generates OSD data to display, on the display device of the display unit 16, various information such as a photography mode of the imaging apparatus 1, the various setting information, a battery remaining charge amount, the number of obtainable photographs, the photographable time, and the AF area. The display control unit 23 inputs, to the display unit 16, image data on which the OSD based on the OSD data is superimposed.

The inclination judging unit 24 calculates the inclination of the optical axis of the imaging lens of the lens 11 relative to the targets of judgment on the basis of the angular velocity signal detected by the angular velocity sensor 19. For example, when the reinforcing bars 3 arranged in lattice form for use in a floor slab are the targets of judgment, the arrangement plane of the reinforcing bars 3 is a plane parallel to a horizontal plane. In this case, the inclination judging unit 24 calculates the inclination of the optical axis of the imaging lens relative to the horizontal plane.

The target extraction unit 25 extracts the targets of judgment from the image. For example, when the reinforcing bars 3 arranged in lattice form for use in a floor slab are the targets of judgment, the target extraction unit 25 extracts the reinforcing bars 3 from the image. The target extraction unit 25 first extracts a target (reference target) to be the reference of judgment from the image. The target extraction unit 25 then extracts a target (comparative target) to be compared with the reference target from the image. For example, the target extraction unit 25 extracts the reinforcing bars 3 shown in the judgment image by using spatial recognition, pattern recognition, or object recognition. Specifically, the target extraction unit 25 extracts bar-shaped objects from the image, and thereby extracts, as a judgment target, the reinforcing bars 3 which are constructed as the structure 2. Moreover, the target extraction unit 25 may be configured to extract the reinforcing bars 3 on the basis of the colors or designs.

The interval judging unit 26 judges whether the reinforcing bars 3 are arranged at preset intervals (e.g. equal intervals) on the basis of the figures of the reinforcing bars 3 shown in the judgment image. Moreover, the interval judging unit 26 may be configured to indicate a warning on the basis of whether the interval between the targets is proper. That is, when judging that the interval between the targets is not proper, the interval judging unit 26 may display this fact on the display unit 16. Moreover, the interval judging unit 26 may clearly indicate the targets at the improper intervals on the judgment image displayed on the display unit 16. The interval judging unit 26 comprises a first interval judging unit 28 which performs first interval judgment processing, and a second interval judging unit 29 which performs second interval judgment processing.

The first interval judging unit 28 performs the first interval judgment processing to judge whether the reinforcing bars 3 are arranged at preset intervals (e.g. equal intervals) by comparing the diameters of the reinforcing bars 3 shown in the judgment image. The first interval judgment processing by the first interval judging unit 28 will be described later.

The second interval judging unit 29 performs the second interval judgment processing to judge whether the reinforcing bars 3 are arranged at preset intervals (e.g. equal intervals) on the basis of the positions of the reinforcing bars 3 shown in the judgment image and the inclination of the optical axis of the imaging lens of the lens 11 at the time of the acquisition of the judgment image. The second interval judgment processing by the second interval judging unit 29 will be described later.

The interval judging unit 26 integrally judges whether the arrangement of the reinforcing bars 3 is proper on the basis of both or one of the result of the first interval judgment processing by the first interval judging unit 28 and the result of the second interval judgment processing by the second interval judging unit 29. For example, when judging that the reinforcing bars 3 are arranged at the preset intervals in both the first interval judgment processing by the first interval judging unit 28 and the second interval judgment processing by the second interval judging unit 29, the interval judging unit 26 judges that the arrangement of the reinforcing bars 3 is proper. For example, the interval judging unit 26 may also be configured to judge that the arrangement of the reinforcing bars 3 is proper when it is judged that the reinforcing bars 3 are arranged at the preset intervals in one of the first interval judgment processing by the first interval judging unit 28 and the second interval judgment processing by the second interval judging unit 29.

The recording control unit 27 forms the image data acquired by the imaging action into a file, and writes the file into the recording medium M attached to the memory I/F 17. The recording control unit 27 also writes the result of the above judgment processing into the recording medium M attached to the memory I/F 17. The recording control unit 27 may also be configured to write the judgment image and the result of the judgment processing into the recording medium M attached to the memory I/F 17 in association with each other. For example, the recording control unit 27 may also be configured to write one or more of the result of the first interval judgment processing, the result of the second interval judgment processing, and the integral judgment result, and the judgment image into the recording medium M attached to the memory I/F 17 in association with each other.

Figure 3:
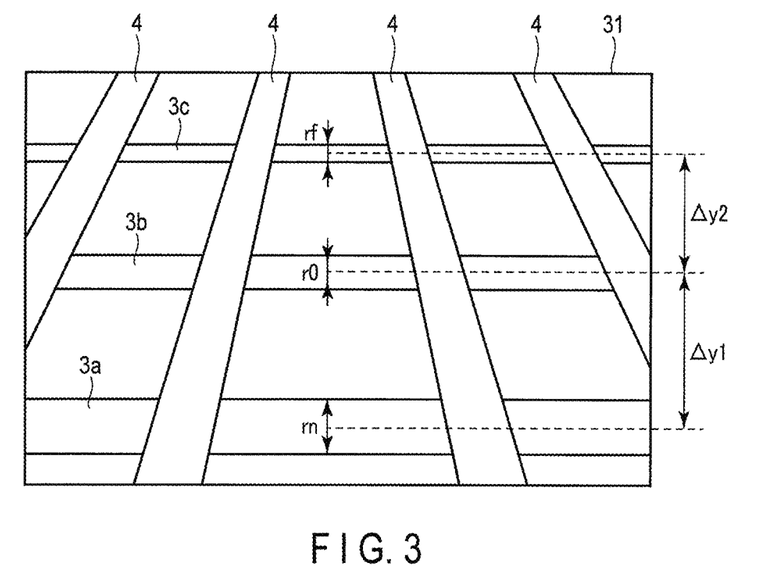
FIG. 3 is a diagram illustrating an example of a judgment image acquired by the imaging apparatus according to one embodiment.

Next, the first interval judgment processing by the first interval judging unit 28 is described. FIG. 3 shows an example of a judgment image 31 acquired by the imaging unit. Three reinforcing bars 3 and the reinforcing bars 4 are shown in the judgement image 31. A reinforcing bar 3a, a reinforcing bar 3b, and a reinforcing bar 3c lie in ascending order of distance from the imaging apparatus 1. The reinforcing bar 3b is treated as a reference target, and the reinforcing bar 3a and the reinforcing bar 3c before and after the reinforcing bar 3b are treated as comparative targets. Although the drawing shows here as if the lateral direction (X-direction) of the image pickup device exactly corresponds to the extending direction of the measurement targets, it should be added that a similar image can also be acquired by a rotational correction of the image pickup device using a motor or an actuator even in the event of any rotation if a correction such as image processing is made. Anything having such a configuration (an image pickup device position changing unit and a rotational image processing unit) also falls within the scope of the present application. While the space between the reinforcing bars is considered as the interval here, it goes without saying that the uniformity of the thickness of the reinforcing bars can be seen if a reinforcing bar part between the intervals is seen. Objects do not need to be bar-shaped, and such objects as steppingstones can also be measured with similar advantageous effects.

The first interval judging unit 28 judges whether the reinforcing bars 3 are arranged at the predetermined intervals on the basis of the relation between a diameter rn of the reinforcing bar 3a, a diameter r0 of the reinforcing bar 3b, and a diameter rf of the reinforcing bar 3c in the judgment image 31.

Figure 4:
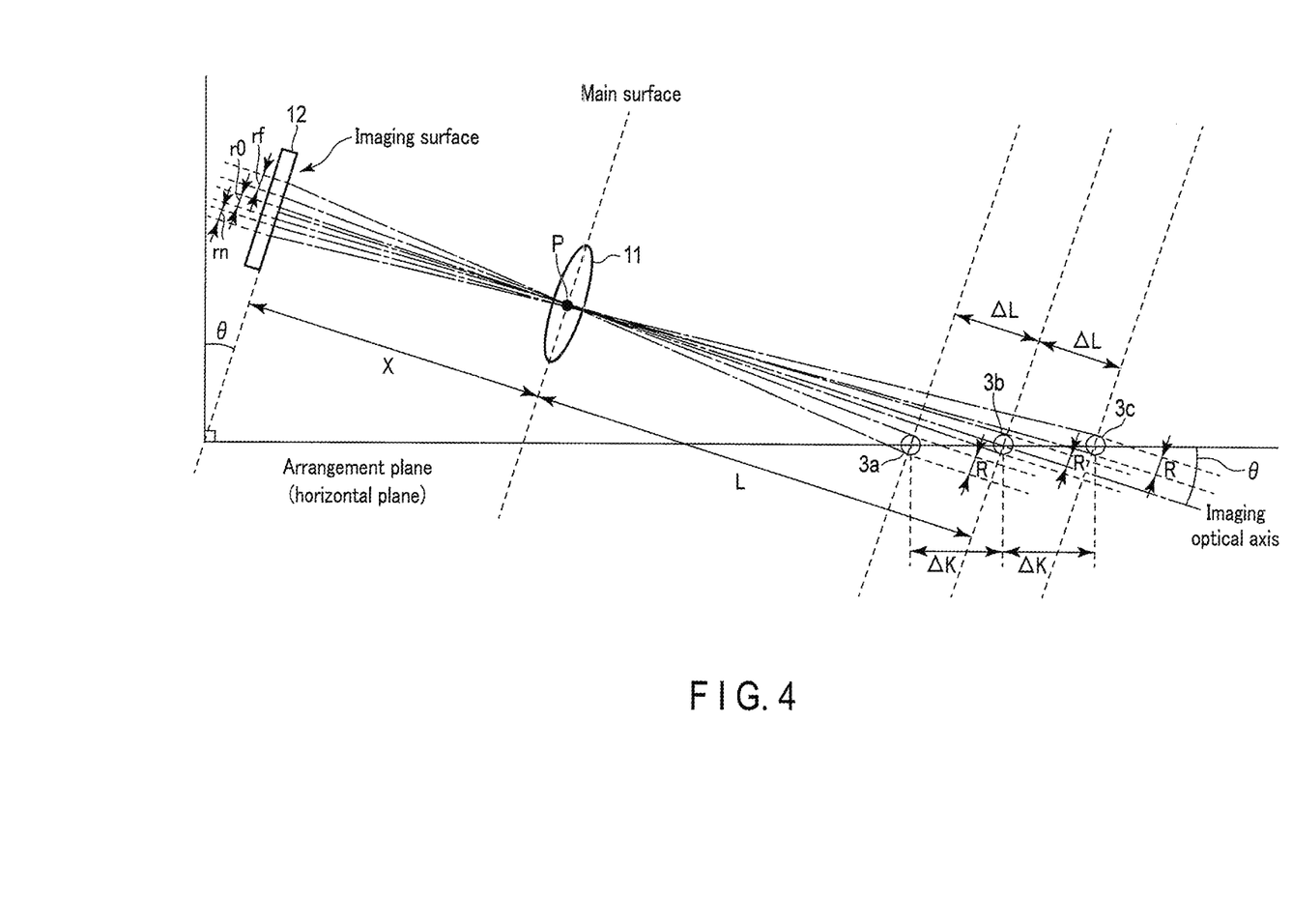
FIG. 4 is a diagram illustrating an example of first interval judgment processing in the imaging apparatus according to one embodiment.

For example, the first interval judging unit 28 judges whether the reinforcing bars 3 are arranged at equal intervals. FIG. 4 is a diagram in which the positional relation between the imaging apparatus 1 and the reinforcing bars 3 is seen from the extending direction of the reinforcing bars 3. As shown in FIG. 4, the actual diameters of the reinforcing bar 3a, the reinforcing bar 3b, and the reinforcing bar 3c are R, the subject distance to the reinforcing bar 3b as the reference is L, and the distance (focus distance) from the imaging surface to a principal point P of the imaging lens is X.

Here, the reinforcing bar 3a, the reinforcing bar 3b, and the reinforcing bar 3c are arranged on the arrangement plane at intervals $\Delta K$. The angle formed by the optical axis of the imaging lens and the arrangement plane is $\theta$. In this case, $\Delta L$ which is the difference of subject distance between the reinforcing bar 3a and the reinforcing bar 3b and the difference of subject distance between the reinforcing bar 3a and the reinforcing bar 3c can be represented as $\Delta L = \Delta K \cdot \cos \theta$. When the reinforcing bars 3 are arranged at equal intervals, $$r0 = R \cdot X / L \quad \text{(Equation 1)}$$

$$rn = R \cdot X / (L - \Delta L) \quad \text{(Equation 2)}$$

$$rf = R \cdot X / (L + \Delta L) \quad \text{(Equation 3)}$$

are satisfied.

From Equation 2, $$\Delta L = L - R \cdot X/rn \quad \text{(Equation 4)}$$

can be derived.

From Equation 3, $$\Delta L = R \cdot X/rf - L \quad \text{(Equation 5)}$$

can be derived.

Because Equation 4 and Equation 5 are equal on the left side, $$L - R \cdot X/rn = R \cdot X/rf - L \quad \text{(Equation 6)}$$

is satisfied.

From Equation 6, $$X \cdot R((1/rf) + (1/rn)) = 2L \quad \text{(Equation 7)}$$

is satisfied.

From Equation 1, $$X \cdot R = r0 \cdot L \quad \text{(Equation 8)}$$

can be derived.

If Equation 8 is substituted for Equation 7, $$(r0/rf) + (r0/rn) = 2 \quad \text{(Equation 9)}$$

can be derived.

The first interval judging unit 28 respectively calculates the diameter rn of the reinforcing bar 3a, the diameter r0 of the reinforcing bar 3b, and the diameter rf of the reinforcing bar 3c on the basis of the judgment image 31. When Equation 9 is satisfied by the substitution of the values of the diameter rn, the diameter r0, and the diameter rf for Equation 9, the first interval judging unit 28 judges that the reinforcing bar 3a, the reinforcing bar 3b, and the reinforcing bar 3c are arranged at equal intervals. Although the three reinforcing bars 3 are targeted to judge their interval judging unit 28 can also judge the here, the first interval judging unit 28 can also judge the interval between four or more reinforcing bars by changing the reinforcing bar to be the reference target and then judging the interval.

Because it is assumed that the reinforcing bars 3 can not be arranged strictly at equal intervals in actuality, a margin may be provided for the judgment by the first interval judging unit 28 as to whether the reinforcing bar 3a, the reinforcing bar 3b, and the reinforcing bar 3c are arranged at equal intervals. For example, the first interval judging unit 28 may be configured to judge that the reinforcing bar 3a, the reinforcing bar 3b, and the reinforcing bar 3c are arranged at equal intervals when $(r0/rf) + (r0/rn) \approx 2$. Moreover, the first interval judging unit 28 may also be configured to judge that the reinforcing bar 3a, the reinforcing bar 3b, and the reinforcing bar 3c are arranged at equal intervals when the value of $(r0/rf) + (r0/rn)$ is within any set range.

Next, the second interval judgment processing by the second interval judging unit 29 is described. The second interval judging unit 29 judges whether the reinforcing bars 3 are arranged at the predetermined intervals on the basis of the relation between an interval $\Delta y1$ of the reinforcing bar 3a and the reinforcing bar 3b in the judgment image 31 shown in FIG. 3 and an interval $\Delta y2$ of the reinforcing bar 3a and the reinforcing bar 3c. The reinforcement bar 3b is treated as a reference target, and the reinforcing bar 3a and the reinforcing bar 3c before and after the reinforcing bar 3b are treated as comparative targets.

Figure 5:
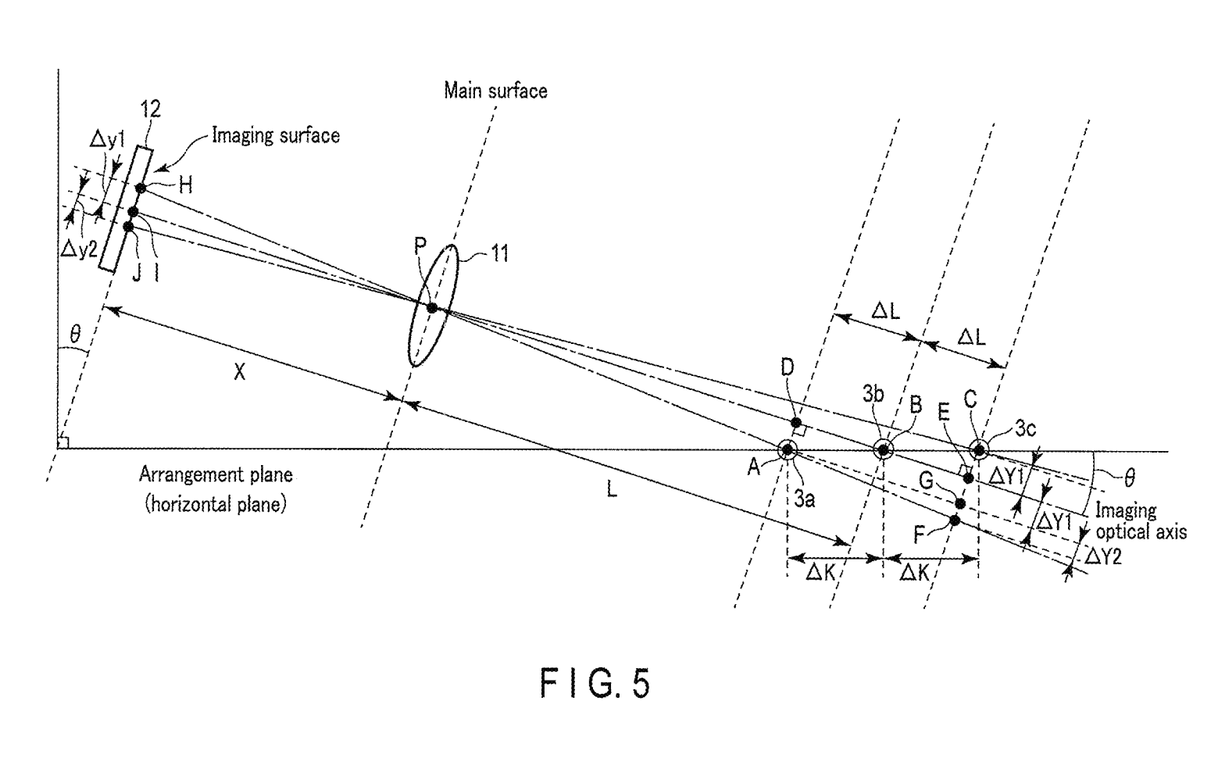
FIG. 5 is a diagram illustrating an example of second interval judgment processing in the imaging apparatus according to one embodiment.

For example, the second interval judging unit 29 judges whether the interval between the reinforcing bar 3b and the reinforcing bar 3a and the interval between the reinforcing bar 3b and the reinforcing bar 3c are equally arranged in a state where the reinforcing bar 3b as the reference intersects with the optical axis (imaging optical axis) of the imaging lens. FIG. 5 is a diagram in which the positional relation between the imaging apparatus 1 and the reinforcing bars 3 is seen from the extending direction of the reinforcing bars 3. As shown in FIG. 5, the subject distance to the reinforcing bar 3b is L, and the distance (focus distance) from the imaging surface to the principal point P of the imaging lens is X. The position of the reinforcing bar 3a in the space is a point A, the position of the reinforcing bar 3b is a point B, and the position of the reinforcing bar 3c is a point C. A point located at the same subject distance as the point A on the imaging optical axis is a point D, and a point located at the same subject distance as the point C on the imaging optical axis is a point E. A point at which the extension of the principal point P and the point A intersects with a plane that intersects at right angles with the imaging optical axis at the point E is a point F. A point at which an auxiliary line that extends parallel to the imaging optical axis from the point A intersects with a plane that intersects at right angles with the imaging optical axis at the point E is a point G. The position at which the reinforcing bar 3a is shown on the imaging surface is a point H, the position at which the reinforcing bar 3b is shown is a point I, and the position at which the reinforcing bar 3c is shown is a point J.

Here, the reinforcing bar 3a, the reinforcing bar 3b, and the reinforcing bar 3c are arranged on the arrangement plane at intervals $\Delta K$. The angle formed by the optical axis of the imaging lens and the arrangement plane is $\theta$. In this case, $\Delta L$ which is the difference of subject distance between the reinforcing bar 3a and the reinforcing bar 3b and the difference of subject distance between the reinforcing bar 3a and the reinforcing bar 3c can be represented as $\Delta L = \Delta K \cdot \cos \theta$.

If the reinforcing bar 3a, the reinforcing bar 3b, and the reinforcing bar 3c are arranged on the arrangement plane at equal intervals, a triangle ABD is congruent with a triangle CBE, so that the interval between the point D and the point B and the interval between the point E and the point B have an equal length $\Delta L$, and the interval between the point D and the point A and the interval between the point E and the point C are $\Delta Y1$ and equal. A triangle JIP is similar to a triangle CEP, so that an interval $\Delta y1$ between the point J and the point I is represented by $$\Delta y1 = X \cdot \Delta Y1 / (L + \Delta L) \quad \text{(Equation 10)}.$$

A triangle HIP is similar to a triangle FEP, so that an interval $\Delta y2$ between the point H and the point I is represented by $$\Delta y2 = X \cdot (\Delta Y1 + \Delta Y2) / (L + \Delta L) \quad \text{(Equation 11)}.$$

The triangle HIP is similar to a triangle FAG, so that an interval $\Delta Y2$ between the point F and the point G is represented by $$\Delta Y2 = 2\Delta L \cdot \Delta y2 / X \quad \text{(Equation 12)}$$

$\Delta Y1$ which is the interval between the point D and the point A and the interval between the point E and the point C is represented by $$\Delta Y1 = \Delta L \cdot \tan \theta \quad \text{(Equation 13)}.$$

If Equation 12 is substituted for Equation 11, $$\Delta y2 = X \cdot (\Delta Y1 + 2\Delta L \cdot \Delta y2 / X) / (L + \Delta L) \quad \text{(Equation 14)}$$

can be derived.

From Equation 14, $$\Delta y2(L + \Delta L) = X \cdot \Delta Y1 + 2\Delta L \cdot \Delta y2 \quad \text{(Equation 15)}$$

can be derived.

If Equation 13 is substituted for Equation 15, $$\Delta y2(L+\Delta L) = X \cdot \Delta L \cdot \tan\theta + 2\Delta L \cdot \Delta y2 \quad \text{(Equation 16)}$$

can be derived.

If Equation 10 is transformed, $$\Delta y1(L+\Delta L) = X \cdot \Delta Y1 \quad \text{(Equation 17)}$$

can be derived.

Furthermore, if Equation 13 is substituted for Equation 17, $$\Delta y1(L+\Delta L) = X \cdot \Delta L \cdot \tan\theta \quad \text{(Equation 18)}$$

can be derived.

Moreover, the ratio between Δy1 and Δy2 is indicated by use of Equation 16 and Equation 18;

$$\Delta y2/\Delta y1 = (X \cdot \Delta L \cdot \tan\theta + 2\Delta L \cdot \Delta y2)/(X \cdot \Delta L \cdot \tan\theta) \quad \text{(Equation 19)}$$

can be derived.

If Equation 19 is transformed, $$\Delta y2/\Delta y1 = 1 + (2 \cdot \Delta y2)/(X \cdot \tan\theta) \quad \text{(Equation 20)}$$

can be derived.

The second interval judging unit 29 respectively calculates the interval Δy1 of the reinforcing bar 3a and the reinforcing bar 3b and the interval Δy2 of the reinforcing bar 3b and the reinforcing bar 3c on the basis of the judgment image 31. When Equation 20 is satisfied by the substitution of the values of the interval Δy1, the interval Δy2, the focus distance X, and the inclination θ for Equation 20, the second interval judging unit 29 judges that the reinforcing bar 3a, the reinforcing bar 3b, and the reinforcing bar 3c are arranged at equal intervals. Although the three reinforcing bars 3 are targeted to judge their interval in the example described here, the second interval judging unit 29 can also judge the interval between four or more reinforcing bars by changing the reinforcing bar to be the reference target and then judging the interval.

Because it is assumed that the reinforcing bars 3 can not be arranged strictly at equal intervals in actuality, margin may be provided for the judgment by the second interval judging unit 29 as to whether the reinforcing bar 3a, the reinforcing bar 3b, and the reinforcing bar 3c are arranged at equal intervals. For example, the second interval judging unit 29 may be configured to judge that the reinforcing bar 3a, the reinforcing bar 3b, and the reinforcing bar 3c are arranged at equal intervals when $\Delta y2/\Delta y1 \approx 1 + (2 \cdot \Delta y2)/(X \cdot \tan\theta)$. Moreover, the second interval judging unit 29 may also be configured to judge that the reinforcing bar 3a, the reinforcing bar 3b, and the reinforcing bar 3c are arranged at equal intervals when the difference between Δy2/Δy1 and $1+(2 \cdot \Delta y2)/(X \cdot \tan\theta)$ is within a preset range.

Figure 6:
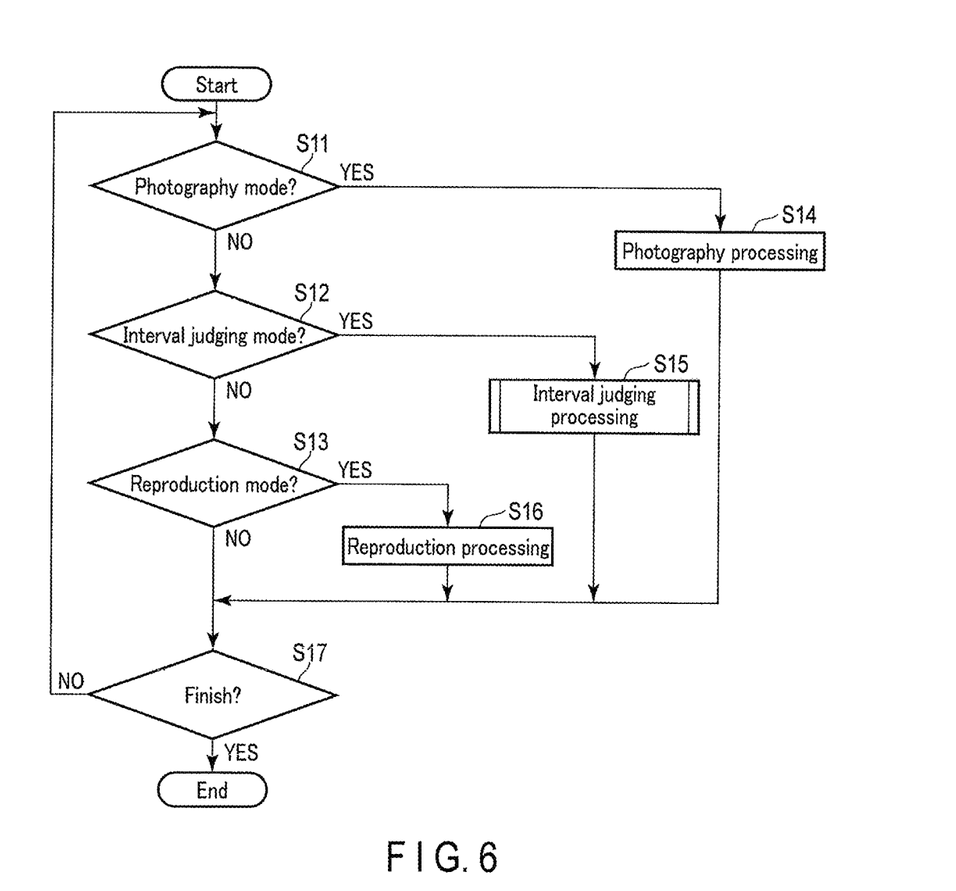
FIG. 6 is a diagram illustrating an example of the operation of the imaging apparatus according to one embodiment.
Figure 7:
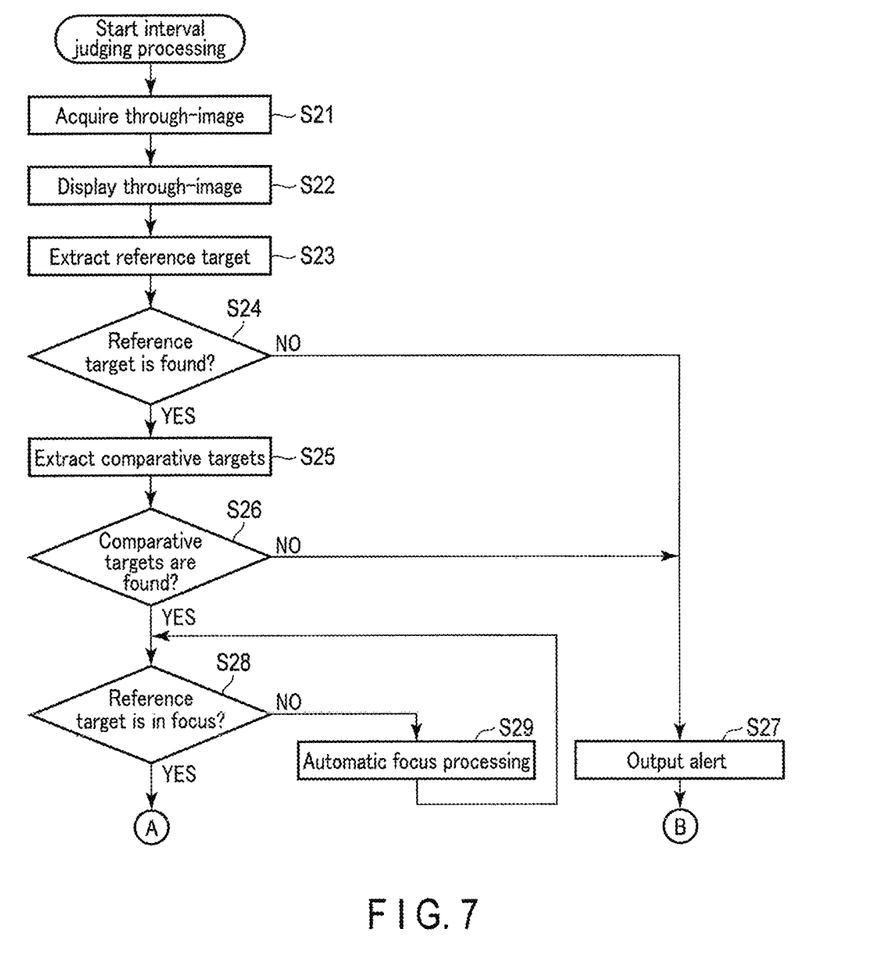
FIG. 7 is a diagram illustrating an example of interval judgment processing in the imaging apparatus according to one embodiment.
Figure 8:
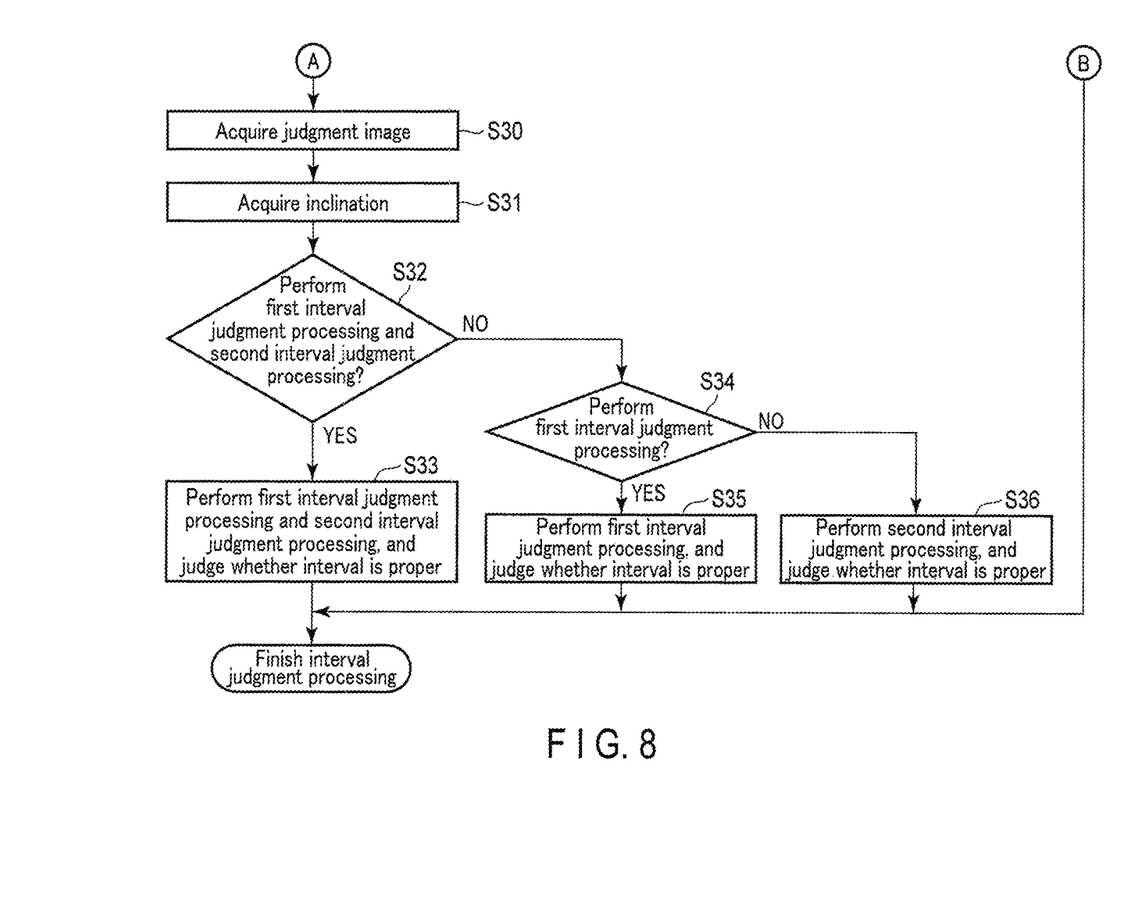
FIG. 8 is a diagram illustrating an example of the interval judgment processing in the imaging apparatus according to one embodiment.

FIG. 6 to FIG. 8 are flowcharts illustrating an example of the operation of the imaging apparatus 1. FIG. 6 is a flowchart illustrating processing regarding mode selection in the imaging apparatus 1.

The main control unit 20 of the imaging apparatus 1 respectively judges whether a photography mode is selected (step S11), an interval judging mode is selected (step S12), and a reproduction mode is selected (step S13).

When it is judged in step S11 that the photography mode is selected (step S11, YES), the main control unit 20 performs photography processing (step S14), and proceeds to step S17. The photography processing is processing in which the imaging apparatus 1 performs the imaging action in response to operation and then records image data.

When it is judged in step S12 that the interval judging mode is selected (step S12, YES), the main control unit 20 performs interval judging processing (step S15), and proceeds to step S17. The interval judging processing is processing to judge whether the interval between targets such as the reinforcing bars 3 is a preset interval.

When it is judged in step S13 that the reproduction mode is selected (step S13, YES), the main control unit 20 performs reproduction processing (step S16), and proceeds to step S17. The reproduction processing is processing in which the imaging apparatus 1 reproduces a file recorded in the recording medium M in response to operation and then displays the file on the display unit 16.

When it is judged in step S13 that the reproduction mode is not selected (step S13, NO), the main control unit 20 judges whether to finish the action (step S17). When the main control unit 20 does not finish the action (step S17, NO), the main control unit 20 returns to step S11. When the main control unit 20 finishes the action (step S17, YES), the main control unit 20 finishes the processing in FIG. 6.

FIG. 7 and FIG. 8 are flowcharts illustrating the interval judging processing shown in step S15 in FIG. 6.

The main control unit 20 acquires image data displayable as a through-image by the imaging unit (step S21). The main control unit 20 performs through-image display to display the image data acquired in step S21 on the display unit 16 (step S22).

The main control unit 20 extracts a reference target from the image data by the target extraction unit 25 (step S23). The main control unit 20 extracts, for example, middle one of the three reinforcing bars 3 which are bar-shaped and which are arranged on the far side when seen from the imaging apparatus 1, as the reference target from the image data.

The main control unit 20 judges whether the reference target is extracted in step S23 (step S24). When the main control unit 20 judges that the reference target is extracted (step S24, YES), the main control unit 20 extracts comparative targets from the image data by the target extraction unit 25 (step S25). The main control unit 20 extracts, for example, two reinforcing bars which are bar-shaped and which are arranged on the far side when seen from the imaging apparatus 1 and which are adjacent to the reference target, as the comparative targets from the image data.

The main control unit 20 judges whether the comparative targets are extracted (step S26). When the main control unit 20 judges that the reference target is not extracted in step S24 (step S24, NO) or that the comparative targets are not extracted in step S26 (step S26, NO), the main control unit 20 outputs an alert (step S27), and finishes the interval judging processing. For example, the main control unit 20 outputs, by the display unit 16, an alert display to urge to modify the direction of the imaging apparatus 1 because the reference target or both the reference target and the comparative targets are not extracted within a field angle. Irregular arrangement itself may be regarded as a problem, and a defect mark may be displayed. Otherwise, the part in which a measurement problem is found may be displayed on the image of the measurement target so that the problem may be clear. It is naturally possible that a mechanism which modifies the arrangement of the targets in accordance with the measurement result cooperates. When the posture in an inspection is not good, an application to automate the correction of the angle, position, or field angle of the inspecting apparatus is also possible.

When the main control unit 20 judges that the comparative targets are extracted in step S26 (step S26, YES), the main control unit 20 judges whether the targets of judgment are in focus (step S28). For example, the main control unit 20 judges whether both the reference target and the comparative targets are in focus. The main control unit 20 may be configured to judge whether focusing has been achieved in accordance with the standard of focusing in normal imaging processing, or may be configured to judge that focusing has been achieved when the degree of focusing enables the execution of the first interval judging processing and the second interval judging processing.

When the main control unit 20 judges that the targets of judgment are not in focus (step S28, NO), the main control unit 20 performs the automatic focus processing (step S29), and returns to the processing in step S28. The main control unit 20 may be configured to increase the depth of field by controlling the diaphragm mechanism of the lens 11 when the targets of judgment are not brought into focus even by the automatic focus processing in step S29. For example, the main control unit 20 may be configured to omit step S28 and step S29 by setting an aperture value that permits pan focus.

When the main control unit 20 judges that the targets of judgment are in focus (step S28, YES), the main control unit 20 acquires a judgment image by performing an imaging action (step S30).

The main control unit 20 also acquires the inclination of the imaging optical axis at the time of the acquisition of the judgment image (step S31). The main control unit 20 acquires the inclination of the imaging optical axis in a direction parallel to the direction of the interval to be judged. For example, when the arrangement of the reinforcing bars 3 for use in a floor slab is the target of judgment as in this example, it is assumed that the extending direction and arrangement direction of the reinforcing bars are parallel to the horizontal plane. Therefore, the main control unit 20 acquires the inclination of the imaging optical axis relative to the horizontal plane at the time of the acquisition of the judgment image.

The main control unit 20 decides whether to judge the interval on the basis of both the result of the first interval judgment processing and the result of the second interval judgment processing (step S32).

When the main control unit 20 decides to judge the interval on the basis of both the result of the first interval judgment processing and the result of the second interval judgment processing (step S32, YES), the main control unit 20 performs the first interval judgment processing by the first interval judging unit 28 on the basis of the judgment image acquired in step S30, performs the second interval judgment processing by the second interval judging unit 29 on the basis of the judgment image acquired in step S30 and the inclination acquired in step S31, judges whether the arrangement of the reinforcing bars 3 is proper on the basis of both the result of the first interval judgment processing and the result of the second interval judgment processing (step S33), and finishes the interval judgment processing. For example, the main control unit 20 judges that the arrangement of the reinforcing bars 3 is proper when the main control unit 20 has judged that the reinforcing bars 3 are arranged at the predetermined intervals in both the first interval judgment processing by the first interval judging unit 28 and the second interval judgment processing by the second interval judging unit 29. The main control unit 20 may also be configured to judge that the arrangement of the reinforcing bars 3 is proper when the main control unit 20 has judged that the reinforcing bars 3 are arranged at the predetermined intervals in one of the first interval judgment processing by the first interval judging unit 28 and the second interval judgment processing by the second interval judging unit 29.

When the main control unit 20 decides not to judge the interval on the basis of both the result of the first interval judgment processing and the result of the second interval judgment processing in step S32 (step S32, NO), the main control unit 20 decides whether to perform the first interval judgment processing (step S34). When the main control unit 20 decides to perform the first interval judgment processing in step S34 (step S34, YES), the main control unit 20 performs the first interval judgment processing by the first interval judging unit 28 on the basis of the judgment image acquired in step S30, judges whether the arrangement of the reinforcing bars 3 is proper on the basis of the result of the first interval judgment processing (step S35), and finishes the interval judgment processing.

When the main control unit 20 decides not to perform the first interval judgment processing in step S34 (step S34, NO), the main control unit 20 performs the second interval judgment processing by the second interval judging unit 29 on the basis of the judgment image acquired in step S30 and the inclination acquired in step S31, judges whether the arrangement of the reinforcing bars 3 is proper on the basis of the result of the second interval judgment processing (step S36), and finishes the interval judgment processing.

Furthermore, the main control unit 20 may be configured to write, as the result of the interval judgment processing, one or more of the result of the first interval judgment processing, the result of the second interval judgment processing, and the integral judgment result, and the judgment image into the recording medium M attached to the memory I/F 17 in association with each other.

As described above, the imaging apparatus 1 images the reinforcing bars 3 arranged on a plane to acquire a judgment image, and judges whether the reinforcing bars 3 are arranged at the predetermined intervals on the basis of the figures of the reinforcing bars 3 shown in the acquired judgment image. Consequently, the imaging apparatus 1 can judge whether the arrangement of the reinforcing bars 3 is proper on the basis of the judgment image without detecting the distance between the targets and the imaging apparatus 1.

Moreover, as described above, the imaging apparatus 1 judges whether the arrangement of the reinforcing bars 3 is proper on the basis of both or one of the first interval judgment processing to judge whether the reinforcing bars 3 are arranged at the predetermined intervals by comparing the diameters of the reinforcing bars 3 shown in the judgment image, and the second interval judgment processing to judge whether the reinforcing bars 3 are arranged at the predetermined intervals on the basis of the positions of the reinforcing bars 3 shown in the judgment image and the inclination of the optical axis of the imaging lens of the lens 11 at the time of the acquisition of the judgment image.

According to the first interval judgment processing, it is possible to judge whether the reinforcing bars 3 are arranged at the predetermined intervals even when there is no configuration to detect the inclination of the imaging lens at the time of the acquisition of the judgment image. Therefore, the imaging apparatus 1 can judge whether the arrangement of the reinforcing bars 3 is proper with a simple configuration.

According to the second interval judgment processing, it is possible to more strictly judge whether the reinforcing bars 3 are arranged at the predetermined intervals by detecting, as inclination, the state of the imaging apparatus 1 at the time of the acquisition of the judgment image. Therefore, the imaging apparatus 1 can judge whether the arrangement of the reinforcing bars 3 is proper with great accuracy.

By using both the first interval judgment processing and the second interval judgment processing, the imaging apparatus 1 can judge that the arrangement of the reinforcing bars 3 is not proper when the two results of the processing do not correspond to each other. Therefore, the imaging apparatus 1 can judge whether the arrangement of the reinforcing bars 3 is proper with greater accuracy.

Although the imaging apparatus 1 is configured to image the reinforcing bars 3 to acquire a judgment image and judge whether the arrangement of the reinforcing bars 3 is proper on the basis of the acquired judgment image in the embodiment described above, the imaging apparatus 1 is not limited to this configuration. The imaging apparatus 1 may be configured to perform the first interval judgment processing on the basis of the image data stored in the recording medium M. The imaging apparatus 1 may be configured to perform the second interval judgment processing on the basis of the image data stored in the recording medium M when information regarding the inclination at the time of imaging is added to the image data stored in the recording medium M.

Although the imaging apparatus 1 is configured to acquire a judgment image focused on both the reference target and the comparative targets by performing the focus processing in the embodiment described above, the imaging apparatus 1 is not limited to this configuration. The imaging apparatus 1 may be configured to perform sequential shooting while driving the focus lens, acquire images, perform depth composition by use of the acquired images to generate a depth composite image, and use the depth composite image to generate a judgment image.

Although the imaging apparatus 1 is configured to judge whether the interval between the reinforcing bars 3 which are used in a floor slab and which are arranged in a depth direction when seen from the imaging apparatus 1 is proper in the embodiment described above, the imaging apparatus 1 is not limited to this configuration. The imaging apparatus 1 may be configured to judge whether the interval between the reinforcing bars 4 arranged in a direction that intersects at right angles with the arrangement direction of the reinforcing bars 3 is proper. In this case, the imaging apparatus 1 extracts the reinforcing bars 4 shown in the judgment image, and judges whether the interval between the reinforcing bars 4 is proper on the basis of the interval between the reinforcing bars 4 in the judgment image.

Although the imaging apparatus 1 is configured to judge whether the interval between the reinforcing bars 3 which are used in a floor slab is proper in the embodiment described above, the imaging apparatus 1 is not limited to this configuration. The imaging apparatus 1 may be configured to judge whether the interval between reinforcing bars two-dimensionally arranged in a wall or a ceiling or distribution bars (lateral ties) for use as beams or columns is proper. In this case, the imaging apparatus 1 judges whether the interval between the reinforcing bars is proper on the basis of the inclination of the optical axis of the imaging lens relative to a plane formed by the extending direction and arrangement direction of the reinforcing bars targeted for judgment, and on the basis of the judgment image.

The imaging apparatus 1 may comprise a function to recognize its position by the GPS. According to this configuration, the imaging apparatus 1 previously acquires design information including construction names for the respective construction cases, a list of construction places for the respective construction names, a list of part names in the respective construction places, and reinforcing bar layout diagrams showing the arrangements of reinforcing bars for the respective part names, and compares the position of the imaging apparatus 1 recognized by the GPS with positional information and set information, and can thereby recognize, at the time of the acquisition of the judgment image, the reinforcing bars in the part of the design information to be judged. That is, the imaging apparatus 1 can recognize the arrangement direction and extending direction of the reinforcing bars to be targeted for interval judgment from the design information and the positional information. Thus, the imaging apparatus 1 can recognize the arrangement direction and extending direction of the reinforcing bars to be targeted for interval judgment without relying on user operation, so that it is possible to more easily perform the second interval judgment processing. It is also possible to prevent more than one interval judgment from being made for the same part by recording, on the design information, the parts for which the interval judgment has been finished.

The interval between reinforcing bars is targeted for the interval judgment in the example according to the embodiment described above, the imaging apparatus 1 is not limited to this configuration. The imaging apparatus 1 may be configured to judge whether the interval between, for example, steel frames, holes in a wall, rails and ties of a railroad, or bridge girders, instead of reinforcing bars. Naturally, it is not necessary to limit to buildings and structures, and it is also possible to apply to the management of the finish of a manufacture made at a factory, the arrangement of microstructures which are observed by a microscope, the finish of a microcomponent, the discovery of problems at the time of the mounting and fabrication of the microcomponent, and the judgment of the regularity of an internal structure which is observed by an endoscope. A system comprising an image pickup device and an optical system which guides a figure of a target to the image pickup device can be applied to anything by use of the change of image magnification caused by the difference of distance. That is, anything that relies on a geometrical relational expression resulting from the image magnification change caused by the difference of distance falls within the scope covered by the present application. Moreover, the following application is naturally possible: if the interval is not equal, a problematic part, for example, how the interval is or which part has an unequal interval is specifically displayed. For example, it is possible to automate a correction work to make a correct arrangement by cooperating as an eye of, for example, an automatic correcting robot. Another possible application is to judge whether the interval is a certain interval instead of judging whether the interval is an equal interval, and it is only necessary to change the ratio of the respective numerical expressions or a constant. If the interval is known, it is possible to control the steps of a robot walking with two legs or with multiple legs. Depending on the interval, the robot needs to stop, so that it is also possible to prevent wasteful motions and breakdown or breakage of the robot. It is also possible to recognize textured paving blocks provided for blind people in place of or in aid of a white cane. The judgment is not limited to merely judging whether the interval is equal. When the interval is not equal, it is also possible to detect discontinuity if the location of the rest is judged. The location of an image similar to a detected object has only to be judged, a typical example of which is a crosswalk. It is also possible to apply to the judgment of the place where the regular arrangement is discontinued. Therefore, the present application that enables instantaneous recognition of a certain regulation of a target by an imaging result is an extremely useful invention which is helpful in the automation of various devices and in the assistance of the user.

The configuration of the imaging apparatus 1 described above can be obtained by the installation of a function corresponding to the interval judging unit 26 in a conventional general photographic camera. For example, this configuration can be obtained by the installation of an application in a general camera, so that it is possible to expect the reduction of manufacturing costs by the mass-production effect of imaging apparatuses 1, and the improvement of applicability by high affinity of a user interface.

Various components of the imaging apparatus 1 described above such as the imaging unit, the display unit, and the interval judging unit may be dispersedly mounted on multiple devices capable of communication and thereby obtained as a system. When the various components of the imaging apparatus 1 are dispersedly mounted on multiple devices in this way, the imaging apparatus can be simpler, smaller in size, and lighter. Thus, when the imaging unit is mounted on a pilotless flying device such as a drone and then the display unit and the interval judging unit are mounted on an information processing device such as a smartphone capable of communicating with the drone, it becomes easier to judge the interval between targets in a place which is difficult for a human being to check.

The functions in each of the embodiments described above are not exclusively configured by use of hardware, but can also be obtained by reading a program having each of the functions into a computer using software. Software or hardware may be suitably selected to configure each of the functions.

The present invention is not completely limited to the embodiment described above, and it can be considered that any device which photographs objects arranged at intervals, judges a positional relation at such intervals, and then displays this fact utilizes the present application.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An imaging apparatus comprising:
an image pickup device which acquires a judgment image of a structure that includes judgment targets of nearly a same shape; and
a processor communicatively coupled to the image pickup device, wherein the processor:
calculates intervals between the judgment targets of the structure based on the judgment image, and
judges whether each of the intervals between the judgment targets is within a preset interval based on the calculated intervals;
wherein the wherein the processor further:
compares a figure of a reference target which is one of the judgment targets shown in the judgment image with figures of a pair of comparative targets which are the judgment targets adjacent to the reference target, to judge whether each of the intervals between the judgment targets is within the preset interval; and
judges that the intervals between the judgment targets are within the preset interval when a first ratio between a dimension of the figure of the reference target and a dimension of the figure of one of the pair of comparative targets and a second ratio between the dimension of the figure of the reference target and the dimension of the figure of a second of the pair of comparative targets have a preset relation.

2. The imaging apparatus according to claim 1, wherein the processor further:
determines an inclination of an imaging optical axis relative to an arrangement plane of the judgment targets at a time the judgment image is acquired, and
judges that the intervals between the judgment targets is within the preset interval when the interval between a position of the figure of the reference target and a position of the figure of one of the pair of comparative targets, the interval between the position of the figure of the reference target and the position of the figure of a second of the pair of comparative targets, a focus distance at the time the judgment image is acquired, and the inclination have a preset relation.

3. The imaging apparatus according to claim 2, wherein the processor judges that the intervals between the judgment targets is within the preset interval when the positions of the figures of the judgment targets change the interval between the reference target and the comparative targets in accordance with the inclination and the focus distance.

4. The imaging apparatus according to claim 1, wherein the processor further:
determines an inclination of an imaging optical axis relative to an arrangement plane of the judgment targets at a time when the judgment image is acquired,
determines a first judgment result that indicates when a first ratio between a dimension of the figure of the reference target and a dimension of the figure of one of the pair of comparative targets and a second ratio between the dimension of the figure of the reference target and the dimension of the figure of a second of the pair of comparative targets have a preset relation,
determines a second judgment result that indicates when the interval between the position of the figure of the reference target and the position of the figure of one of the pair of comparative targets, the interval between the position of the figure of the reference target and the position of the figure of the second of the pair of comparative targets, a focus distance at the time when the judgment image is acquired, and the inclination have a preset relation, and
judges whether the intervals between the judgment targets is within the preset interval based on the first judgment result and the second judgment result.

5. The imaging apparatus according to claim 1, wherein the processor judges that the intervals between the judgment targets is within the preset interval when the dimensions of the figures of the judgment targets change in a preset ratio.

6. The imaging apparatus according to claim 1, wherein the structure is a floor slab and the judgment targets are reinforcing bars.

7. A control method of an imaging apparatus comprising:
acquiring a judgment image of a structure that includes judgment targets of substantially a same shape;
calculating intervals between the judgment targets of the structure based on the judgment image;
judging whether each of the intervals between the judgment targets is within a preset interval based on the calculated intervals;
comparing a figure of a reference target which is one of the judgment targets shown in the judgment image with figures of a pair of comparative targets which are the judgment targets adjacent to the reference target, to judge whether each of the intervals between the judgment targets is within the preset interval; and judging that the intervals between the judgment targets are within the preset interval when a first ratio between a dimension of the figure of the reference target and a dimension of the figure of one of the pair of comparative targets and a second ratio between the dimension of the figure of the reference target and the dimension of the figure of a second of the pair of comparative targets have a preset relation.

8. The control method according to claim 7, wherein the structure is a floor slab and the judgment targets are reinforcing bars.

9. A non-transitory recording medium that stores instructions that when executed by a computer in communication with image pickup device, cause the computer to:

instruct the image pickup device to acquire a judgment image of a structure that includes judgment targets of substantially a same shape;

calculate intervals between the judgment targets of the structure based on the judgment image;

judge whether each of the interval between the judgment targets is within a preset interval based on the calculated intervals;

compare a figure of a reference target which is one of the judgment targets shown in the judgment image with figures of a pair of comparative targets which are the judgment targets adjacent to the reference target, to judge whether each of the intervals between the judgment targets is within the preset interval; and judge that the intervals between the judgment targets are within the preset interval when a first ratio between a dimension of the figure of the reference target and a dimension of the figure of one of the pair of comparative targets and a second ratio between the dimension of the figure of the reference target and the dimension of the figure of a second of the pair of comparative targets have a preset relation.

10. The non-transitory recording medium according to claim 9, wherein the structure is a floor slab and the judgment targets are reinforcing bars.

* * * * *